(12) United States Patent
Guo et al.

(10) Patent No.: US 12,326,633 B2
(45) Date of Patent: Jun. 10, 2025

(54) FRONT LIGHT SOURCE AND DISPLAY DEVICE

(71) Applicants: Beijing BOE Display Technology Co., Ltd., Beijing (CN); BOE Technology Group Co., Ltd., Beijing (CN)

(72) Inventors: Yue Guo, Beijing (CN); Yanjun Sun, Beijing (CN); Minghui Zhang, Beijing (CN); Yaohui Wang, Beijing (CN); Zhengang Gao, Beijing (CN); Longyue Gao, Beijing (CN); Qian Zhang, Beijing (CN); Dongyu Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/696,302

(22) PCT Filed: Aug. 1, 2023

(86) PCT No.: PCT/CN2023/110625
§ 371 (c)(1),
(2) Date: Mar. 27, 2024

(87) PCT Pub. No.: WO2024/046014
PCT Pub. Date: Mar. 7, 2024

(65) Prior Publication Data
US 2025/0004331 A1    Jan. 2, 2025

(30) Foreign Application Priority Data
Aug. 29, 2022 (CN) .......................... 202211042221.6

(51) Int. Cl.
*G02F 1/1335* (2006.01)
(52) U.S. Cl.
CPC .............................. *G02F 1/133616* (2021.01)
(58) Field of Classification Search
CPC .................................................. G02F 1/133616
See application file for complete search history.

(56) References Cited

U.S. PATENT DOCUMENTS 11,193,650 B2 * 12/2021 Yang ........................ F21V 3/02

FOREIGN PATENT DOCUMENTS

| CN | 101603665 A | 12/2009 |
|---|---|---|
| CN | 103822117 A | 5/2014 |

(Continued)

*Primary Examiner* — Joseph L Williams
(74) *Attorney, Agent, or Firm* — IPro, PLLC (57) ABSTRACT

A front light source and a display device are disclosed, and the front light source includes a housing extending along a first direction, and a side wall of the housing having an opening extending along the first direction; a supporting frame, located inside the housing and extending along the first direction, where the supporting frame includes a supporting surface; a light bar, where the light bar extends along the first direction and is attached to the supporting surface; and a side of the light bar far away from the supporting surface has a plurality of light-emitting units arranged along the first direction; a polarizing lens located between the light bar and the opening and extending along the first direction; where the polarizing lens includes: a light incident surface, a light exiting surface, a first reflective curved surface and a second reflective curved surface, extending along the first direction.

18 Claims, 7 Drawing Sheets

(56) References Cited

FOREIGN PATENT DOCUMENTS

| | | |
|---|---|---|
| CN | 204512999 U | 7/2015 |
| CN | 107461714 A | 12/2017 |
| CN | 207065476 U | 3/2018 |
| CN | 207162252 U | 3/2018 |
| CN | 207262180 U | 4/2018 |
| CN | 207378571 U | 5/2018 |
| CN | 207516699 U | 6/2018 |
| CN | 108319054 A | 7/2018 |
| CN | 108700267 A | 10/2018 |
| CN | 208295823 U | 12/2018 |
| CN | 110007390 A | 7/2019 |
| CN | 111609346 A | 9/2020 |
| CN | 212056934 U | 12/2020 |
| CN | 216010517 U | 3/2022 |
| CN | 216345525 U | 4/2022 |
| CN | 216448027 U | 5/2022 |
| CN | 115356876 A | 11/2022 |
| TW | 200825331 A | 6/2008 |

\* cited by examiner

FRONT LIGHT SOURCE AND DISPLAY DEVICE

CROSS REFERENCE TO RELATED APPLICATIONS

This application is a National Stage of International Application No. PCT/CN2023/110625, filed on Aug. 1, 2023, which claims priority to Chinese patent application No. 202211042221.6, filed with the China National Intellectual Property Administration on Aug. 29, 2022, and entitled "Front Light Source and Display Device," which is hereby incorporated by reference in its entirety.

TECHNICAL FIELD

The present disclosure relates to the technical field of display device, and in particular to a front light source and a display device.

BACKGROUND

Reflective Liquid Crystal Display (LCD) has many advantages such as low power consumption, thinness, and green eye protection, but external ambient light needs to be reflected to achieve a brightness level. In a dark environment, the display is difficult to meet usage requirements, so it is necessary to set up a front light source of a reflective display. The front light source of the reflective display needs to illuminate the entire LCD screen, but general lighting sources can only illuminate an end of the screen near the lighting source, and the brightness at the end of the screen far away from the lighting source is low, resulting in poor visual perception for human eyes.

SUMMARY

The disclosure provides a front light source and a display device. The front light source is beneficial to uniform illumination of a reflective display screen, and has a simple and reliable structure and low cost.

In order to achieve the above objects, the present disclosure provides following technical solutions.

A front light source, including:
a housing extending along a first direction, and a side wall of the housing having an opening extending along the first direction;
a supporting frame, located inside the housing and extending along the first direction, where the supporting frame includes a supporting surface;
a light bar, where the light bar extends along the first direction and is attached to the supporting surface of the supporting frame; and a side of the light bar far away from the supporting surface has a plurality of light-emitting units arranged along the first direction;
a polarizing lens, where the polarizing lens is located between the light bar and the opening and extends along the first direction;
where the polarizing lens includes: a light incident surface, a light exiting surface, a first reflective curved surface and a second reflective curved surface, extending along the first direction;
the light incident surface is arranged close to the light bar, the light exiting surface is opposite to the opening and parallel to the light incident surface;
the first reflective curved surface and the second reflective curved surface are connected between the light incident surface and the light exiting surface, and distances between the first reflective curved surface and the second reflective curved surface gradually increases along a direction in which the light incident surface points to the light exiting surface; and
both the first reflective curved surface and the second reflective curved surface protrude toward an inner wall of the housing, and a curvature of the first reflective curved surface is greater than a curvature of the second reflective curved surface.

Optionally, the curvature of the first reflective curved surface ranges from 0 to 0.21; and the curvature of the second reflective curved surface ranges from 0 to 0.14.

Optionally, the light incident surface of the polarizing lens is provided with an accommodating groove extending along the first direction, and the plurality of light-emitting units are located in the accommodating groove.

Optionally, side walls of the accommodating groove are flat surfaces, and a bottom surface of the accommodating groove is a curved surface convex toward a notch of the accommodating groove;
a depth of the accommodating groove on a side adjacent to the first reflective curved surface is smaller than a depth of the accommodating groove on a side adjacent to the second reflective curved surface.

Optionally, a curvature of the bottom surface of the accommodating groove ranges from 0 to 0.45.

Optionally, the light exiting surface is a flat surface, and a surface of the light exiting surface is smooth or frosted.

Optionally, the supporting surface of the supporting frame is oriented toward the first reflective curved surface, and an angle between the supporting surface of the supporting frame and the light exiting surface ranges from 15° to 20°.

Optionally, the supporting frame is rotatable around an axis extending along the first direction.

Optionally, the housing is a tubular structure extending along the first direction, and both ends of the housing are provided with side covers for packaging.

Optionally, the side cover is provided with a through hole corresponding to an end of the supporting frame, and the end of the supporting frame extends out of the housing from the corresponding through hole.

Optionally, distances between two adjacent light-emitting units gradually decrease along a direction in which a middle area of the light bar points to an end of the light bar; or
the plurality of light-emitting units on the light bar are arranged at equal intervals along the first direction.

Optionally, an intersection of the light exiting surface and the first reflective curved surface has a first limiting portion extending along the first direction, and an intersection of the light exiting surface and the second reflective curved surface has a second limiting portion extending along the first direction;
an inner wall of the housing has first limiting protrusions located on both sides of the first limiting portion, and second limiting protrusions located on both sides of the second limiting portion.

Optionally, an area of the inner wall of the housing adjacent to the light incident surface has third limiting protrusions located on both sides of the accommodating groove;
the third limiting protrusions are in contact with the polarizing lens, the third limiting protrusions cooperate with the first limiting protrusions and the second limiting protrusions to limit a position of the polarizing lens.

Optionally, the supporting frame is located between the third limiting protrusions on both sides of the accommodation groove, and the supporting surface of the supporting frame is in contact with the notch of the accommodation groove;

the inner wall of the housing has a fourth limiting protrusion that is in contact with a surface of a side of the supporting frame far away from the polarizing lens, and the fourth limiting protrusion, the third limiting protrusions and the polarizing lens cooperate with each other to limit a position of the supporting frame.

Optionally, the light bar includes a first area with the light-emitting units and a second area without the light-emitting units, the first area of the light bar is located in the accommodating groove, and the second area of the light bar is in contact with the notch of the accommodating groove;

the side of the supporting frame far away from the polarizing lens is in a shape of a circular arc towards the fourth limiting protrusion.

The present disclosure also provides a display device, which includes any one of the front light sources according to above embodiments and a reflective display screen;

where the front light source is arranged on a light-emitting side of the reflective display screen and does not block a light-emitting surface of the reflective display screen, the opening in the housing of the front light source is facing the reflective display screen.

Optionally, the front light source is arranged adjacent to a first side of the reflective display screen;

a distance between the front light source and a first surface where the light-emitting surface of the reflective display screen is located ranges from 150 mm to 170 mm; and a distance between an orthographic projection of the front light source on the first surface and the first side ranges from 0 mm to 30 mm.

Optionally, an angle between an opening direction of the front light source and a direction perpendicular to the reflective display screen ranges from 45° to 50°.

The disclosure provides a front light source and a display device. The front light source is provided with a polarizing lens between the light bar and the opening of the housing. The light emitted by the light-emitting units can be injected into the interior of the polarizing lens from the light incident surface of the polarizing lens. In the polarizing lens, light can form total reflection at the first reflective curved surface and the second reflective curved surface. The polarizing lens can achieve a polarizing effect on the light emitted by the plurality of light-emitting units. Due to the fact that the curvature of the first reflective curved surface is greater than the curvature of the second reflective curved surface, and the first reflective curved surface and the second reflective curved surface are arranged asymmetrically, polarization directions of the light emitted from the light exiting surface of the polarizing lens are different, and polarization directions of the light emitted from the opening of the front light source are also different. The above-mentioned front light source is arranged on a side of a reflective display screen. By setting the curvatures of the first reflective curved surface and the second reflective curved surface to be different, when the light emitted from the opening of the front light source irradiates on the reflective display screen, the first reflective curved surface can allow more light to irradiate towards the high-beam end, enabling both the low-beam end and the high-beam end of the reflective display screen to be illuminated, which is beneficial to uniform illumination of the reflective display screen and can improve the display effect of the reflective display screen. In addition, the structure of the polarizing lens in the front light source is simple and reliable, and the cost is low.

Reference numerals are as follows:

1—housing; 11—opening; 12—first limiting protrusion; 13—second limiting protrusion; 14—third limiting protrusion; 15—fourth limiting protrusion; 2—supporting frame; 3—light bar; 31—light—emitting unit; 4—polarizing lens; 41—light incident surface; 42—light exiting surface; 43—first reflective curved surface; 44—second reflective curved surface; 45—accommodating groove; 451—side wall; 452—bottom surface; 5—side cover; 51—through hole; 6—transparent protective plate; 100—front light source; 200—reflective display screen.

DETAILED DESCRIPTION

The technical solutions of embodiments of the present disclosure will be clearly and completely described below in conjunction with the drawings of embodiments of the present disclosure. Obviously, the described embodiments are some, but not all, of the embodiments of the present disclosure. Based on the described embodiments of the present disclosure, all other embodiments obtained by those of ordinary skill in the art without creative efforts fall within the scope of the present disclosure.

Figure 1:
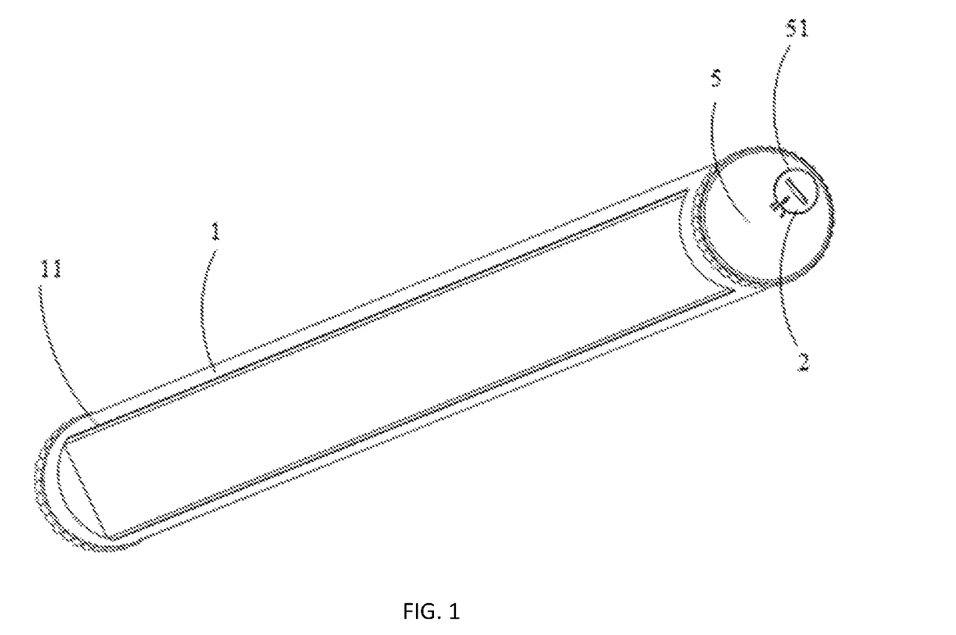
FIG. 1 is a schematic structural diagram of a front light source according to an embodiment of the present disclosure.
Figure 2:
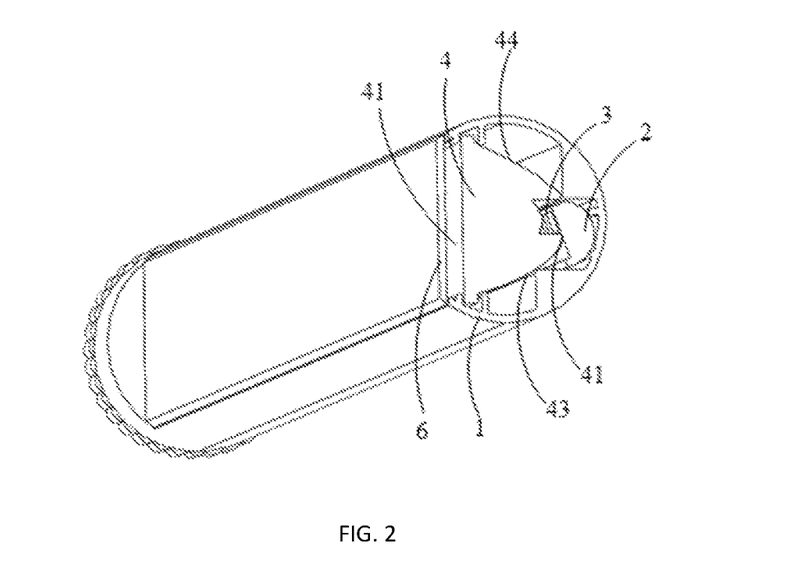
FIG. 2 is a three-dimensional cross-sectional view of a front light source according to an embodiment of the present disclosure.
Figure 3:
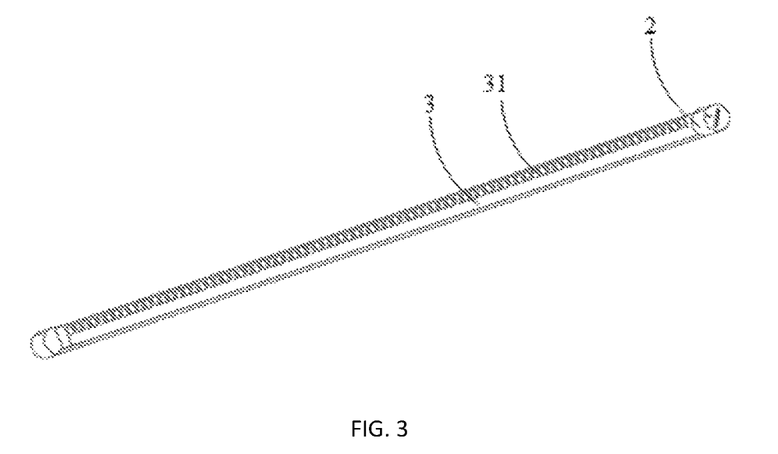
FIG. 3 is a schematic structural diagram of a supporting frame and a light bar according to an embodiment of the present disclosure.

Please refer to FIGS. 1 and 2. The present disclosure provides a front light source, including:

a housing 1 extending along a first direction, and a side wall 451 of the housing 1 having an opening 11 extending along the first direction;

a supporting frame 2, located inside the housing 1 and extending along the first direction, where the supporting frame 2 includes a supporting surface;

a light bar 3, where the light bar 3 extends along the first direction and is attached to the supporting surface of the supporting frame 2; and a side of the light bar 3 far away from the supporting surface has a plurality of light-emitting units 31 arranged along the first direction; as shown in FIG. 3;

a polarizing lens 4, where the polarizing lens 4 is located between the light bar 3 and the opening 11 and extends along the first direction; where the polarizing lens 4 includes: a light incident surface 41, a light exiting surface 42, a first reflective curved surface 43 and a second reflective curved surface 44, extending along the first direction; the light incident surface 41 is arranged close to the light bar 3, the light exiting surface 42 is opposite to the opening 11 and parallel to the light incident surface 41; the first reflective curved surface 43 and the second reflective curved surface 44 are connected between the light incident surface 41 and the light exiting surface 42, and distances between the first reflective curved surface 43 and the second reflective curved surface 44 gradually increases along a direction in which the light incident surface 41 points to the light exiting surface 42; and both the first reflective curved surface 43 and the second reflective curved surface 44 protrude toward an inner wall of the housing 1, and a curvature of the first reflective curved surface 43 is greater than a curvature of the second reflective curved surface 44.

In the front light source according to embodiments of the present disclosure, a polarizing lens 4 is arranged between the light bar 3 and the opening 11 of the housing 1. The light emitted by the light-emitting units 31 can be injected into the interior of the polarizing lens 4 from the light incident surface 41 of the polarizing lens 4. In the polarizing lens 4, light can form total reflection at the first reflective curved surface 43 and the second reflective curved surface 44. The polarizing lens 4 can achieve a polarizing effect on the light emitted by the plurality of light-emitting units 31. Due to the fact that the curvature of the first reflective curved surface 43 is greater than the curvature of the second reflective curved surface 44, and the first reflective curved surface 43 and the second reflective curved surface 44 are arranged asymmetrically, polarization directions of the light emitted from the light exiting surface 42 of the polarizing lens 4 are different, and polarization directions of the light emitted from the opening 11 of the front light source are also different. The above-mentioned front light source is arranged on a side of a reflective display screen. By setting the curvatures of the first reflective curved surface 43 and the second reflective curved surface 44 to be different, when the light emitted from the opening 11 of the front light source irradiates on the reflective display screen, the first reflective curved surface 43 can allow more light to irradiate towards the high-beam end, enabling both the low-beam end and the high-beam end of the reflective display screen to be illuminated, which is beneficial to uniform illumination of the reflective display screen and can improve the display effect of the reflective display screen. In addition, the structure of the polarizing lens 4 in the front light source is simple and reliable, and the cost is low.

The above-mentioned front light source can be applied to dark-state environment lighting of reflective display screen, and can achieve better lighting effects compared to general light sources. Lengths of the opening 11, the supporting frame 2 and the polarizing lens 4 in the above-mentioned front light source can be selected according to the actual situation and are not limited here.

The curvature of the above-mentioned first reflective curved surface 43 ranges from 0 to 0.21; and the curvature of the above-mentioned second reflective curved surface 44 ranges from 0 to 0.14. The specific values of the curvature of the above-mentioned first reflective curved surface 43 and the second reflective curved surface 44 can be set according to conditions such as the location and angle of the front light source and the size of the reflective display screen, and are not limited here.

Figure 4:
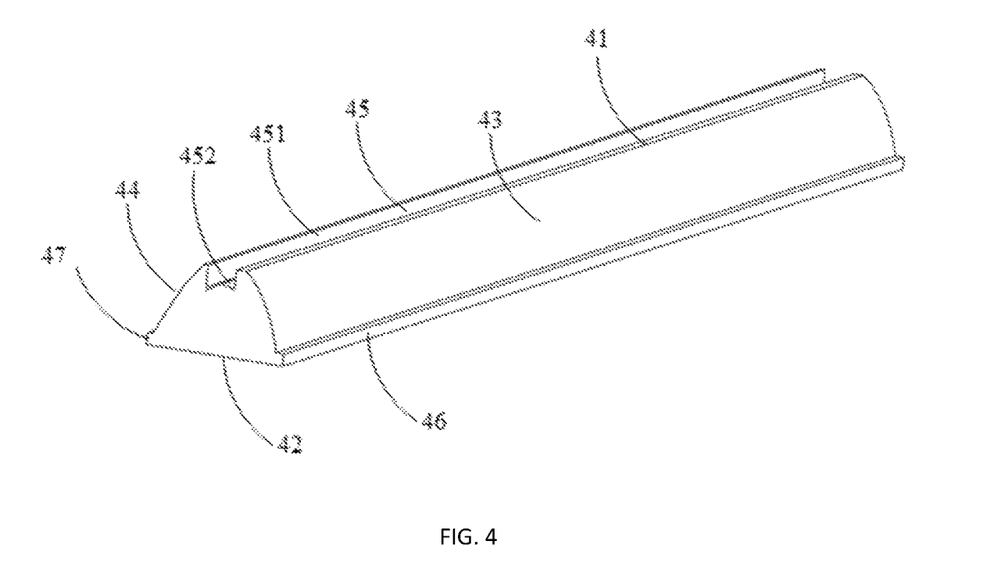
FIG. 4 is a schematic structural diagram of a polarizing lens according to an embodiment of the present disclosure.
Figure 5:
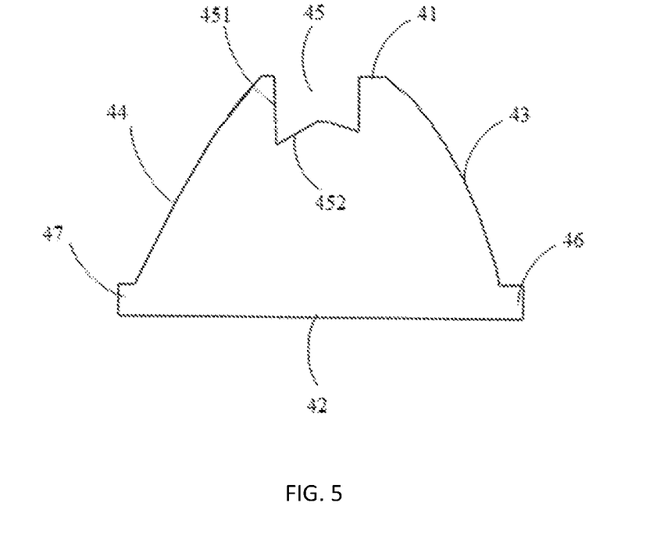
FIG. 5 is a cross-sectional view of a polarizing lens according to an embodiment of the present disclosure.

In embodiments of the present disclosure, as shown in FIGS. 1, 4 and 5, the light incident surface 41 of the polarizing lens 4 may be provided with an accommodating groove 45 extending along the first direction, and the plurality of light-emitting units 31 are located in the accommodating groove 45. The accommodating groove 45 provides accommodating space for the plurality of light-emitting units 31. The side walls 451 and the bottom surface 452 of the accommodating groove 45 are light incident surfaces for the light-emitting units 31.

The side walls 451 of the accommodating groove 45 are flat surfaces, the bottom surface 452 of the accommodating groove 45 is a curved surface convex toward a notch of the accommodating groove 45, and a depth of the accommodating groove 45 on a side adjacent to the first reflective curved surface 43 is smaller than a depth of the accommodating groove 45 on a side adjacent to the second reflective curved surface 44. The light irradiating on the side walls 451 of the accommodating groove 45 can be totally reflected by the first reflective curved surface 43 and the second reflective curved surface 44 and exit the light exiting surface 42, and the light irradiating on the bottom surface 452 of the accommodating groove 45 can be refracted by the bottom surface 452 and exit the light exiting surface 42. The first reflective surface, the second reflective surface, the side walls 451 of the accommodating groove 45, and the bottom surface 452 of the accommodating groove 45 can adjust the polarization direction of the incident light, allowing more light to be irradiated toward the high-beam end.

The curvature of the bottom surface 452 of the above-mentioned accommodation groove 45 can range from 0 to 0.45. The specific value can be set according to the actual situation, and is not limited here.

In embodiments of the present disclosure, the above-mentioned light exiting surface 42 is a flat surface, and the surface of the light exiting surface 42 is smooth or frosted, which can ensure the light-emitting effect of the front light source.

A material of the polarizing lens 4 can be organic glass (PMMA) or other materials, which are selected according to the actual situation and are not shown here. The specific size of the polarizing lens 4 can be determined according to the actual situation and is not limited here. For example, the size of the polarizing lens 4 can be 540 mm, the width of the light exiting surface 42 can be 21.5 mm, and the distance between the light incident surface 41 and the light exiting surface 42 can be 10 mm.

Figure 6:
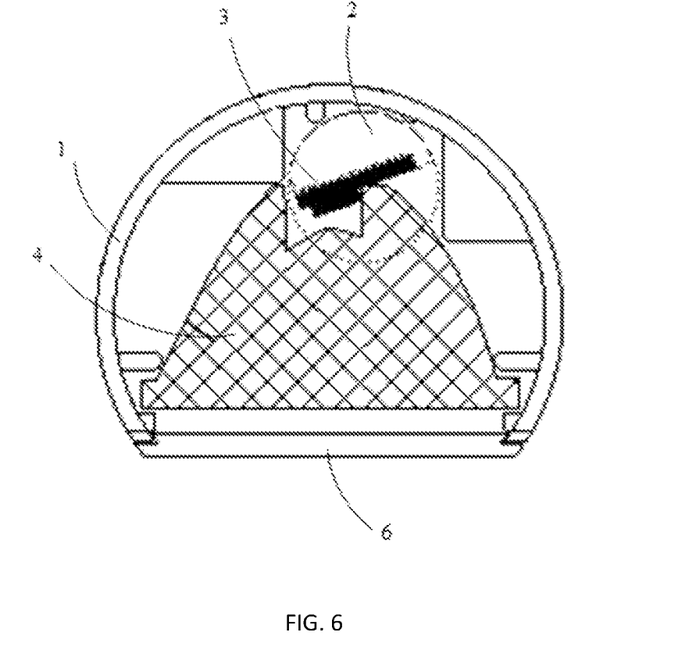
FIGS. 6, 7 and 8 are state diagrams of a front light source according to embodiments of the present disclosure.

In embodiments of the present disclosure, as shown in FIG. 6, the supporting surface of the above-mentioned supporting frame 2 is oriented toward the first reflective curved surface 43, and an angle between the supporting surface and the light exiting surface 42 may range from 15° to 20°. That is, the angle between the surface of the light bar 3 where the light-emitting units 31 are located and the light exiting surface 42 can range from 15° to 20°, which allows more light to irradiate on the first reflective curved surface 43 and allows more light to be directed towards the high-beam end to meet the lighting requirements of the high-beam end. For example, the angle between the supporting surface and the light exiting surface may be 19.62°.

The above-mentioned supporting frame 2 can rotate around an axis extending along the first direction. When the front light source is installed on a side of the reflective display screen, a relative position between the light emitting unit 31 and the polarizing lens 4 can be adjusted by rotating the supporting frame 2. When the front light source is fixed on a side of the reflective display screen, the optimal assembly method for the illumination of the light-emitting units 31 and the polarizing lens 4 can be obtained by rotating the support frame 2, avoiding the problem of the front light source's illumination area not covering the reflective display screen due to assembly errors, and improving the stability of the optical system composed of the front light source and the reflective display screen.

Figure 7:
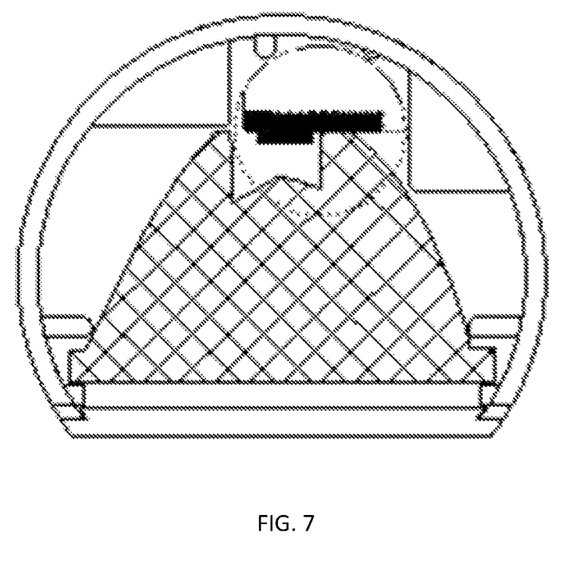
Figure 8:
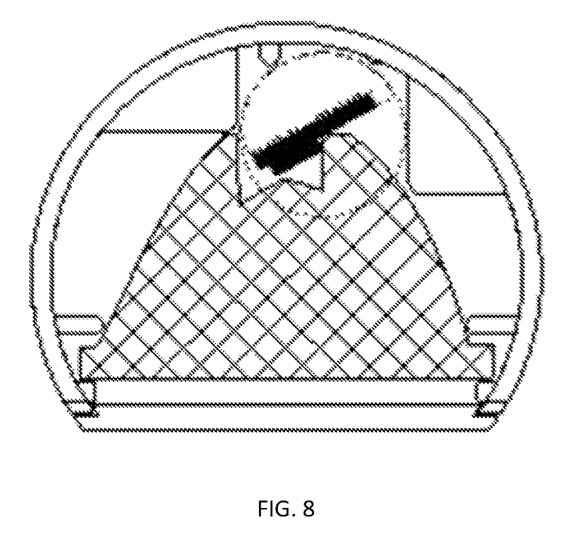

The supporting frame 2 can rotate clockwise or counterclockwise around an axis extending along the first direction to adjust the angle at which light enters the polarizing lens 4. As shown in FIG. 7, the supporting frame 2 can rotate clockwise. For example, the supporting frame 2 can be rotated clockwise by 0°-20° based on the initial position in FIG. 6. As shown in FIG. 7, the supporting frame 2 can rotated to a position where the supporting surface is flush with the light incident surface 41 of the polarizing lens 4. As shown in FIG. 8, the supporting frame 2 can be rotated counterclockwise. For example, the supporting frame 2 can be rotated counterclockwise by 0°-9° based on the initial position in FIG. 6.

The structure of the above-mentioned supporting frame 2 can be an aluminum extrusion strip structure, or the structure of the supporting frame 2 can also be a strip structure of other materials, which can be selected according to the actual situation, and is not limited here.

Figure 9:
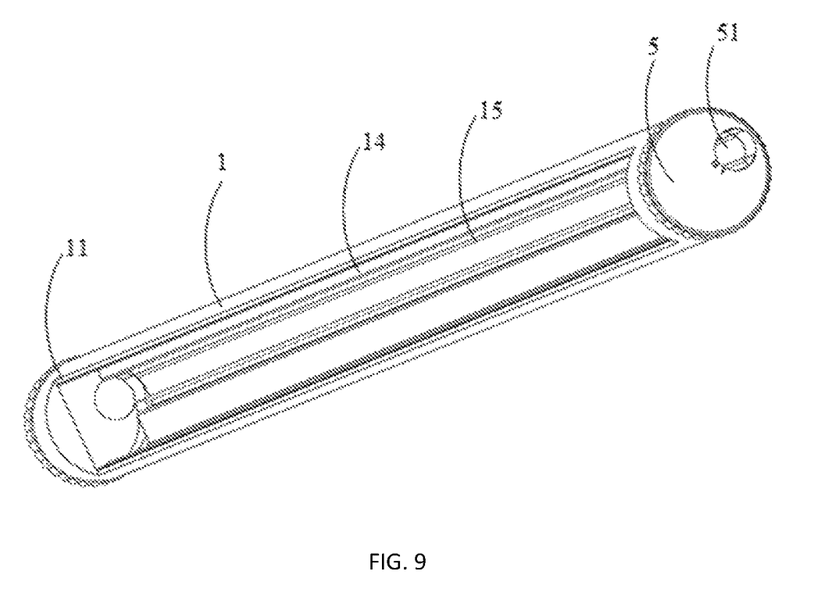
FIG. 9 is a schematic structural diagram of a housing and a side cover according to an embodiment of the present disclosure.

In embodiments of the present disclosure, as shown in FIG. 9, the above-mentioned housing 1 has a tubular structure extending along the first direction, and both ends of the housing 1 have side covers 5 for packaging. When assembling the above-mentioned front light source, the supporting frame 2 with the light bar 3 attached and the polarizing lens 4 can be installed into the interior of the housing 1 through the nozzles at both ends of the tubular housing 1. After assembly, the side covers 5 can seal both ends of housing 1 to protect structures such as polarizing lens 4 and light-emitting unit 31. In order to protect the internal structure of the housing 1, a transparent protective plate 6 may be provided at the opening 11 of the housing 1.

The structure of the housing 1 can be an aluminum extrusion structure, and the structure of the side cover 5 can be a PC injection molding structure.

The above-mentioned side cover 5 may have a through hole 51 corresponding to an end of the supporting frame 2, and the end of the supporting frame 2 may extend out of the housing 1 from the corresponding through hole 51, so that the part of the support frame 2 extending out of the housing 1 can be rotated to drive the part of the support frame 2 located inside the housing 1 to rotate, achieving adjustment of the direction of light irradiation.

Figure 10:
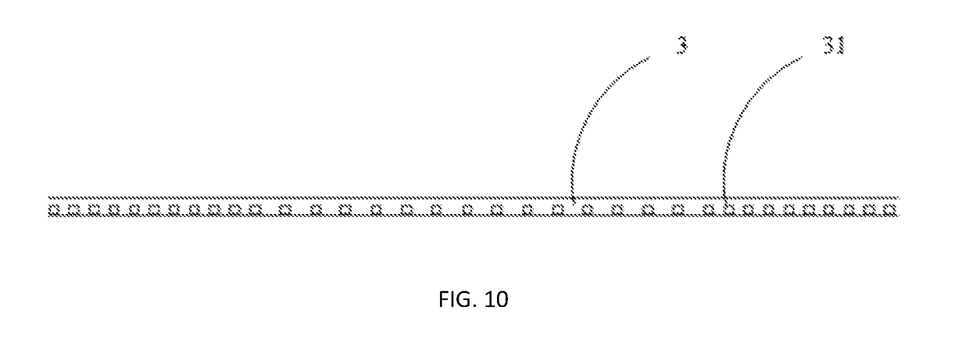
FIG. 10 is a schematic structural diagram of a light bar according to an embodiment of the present disclosure.

In embodiments of the present disclosure, on the supporting surface of the support frame 2, the arrangement of multiple light-emitting units 31 can be as follows: distances between adjacent light-emitting units 31 gradually decrease along a direction in which a middle area of the light bar 3 points to an end of the light bar 3. As shown in FIG. 10, that is, the plurality of light-emitting units 31 are arranged in a manner with high density in the middle and low density on both sides, which can facilitate uniform illumination of a reflective display screen. For example, the distance between adjacent light-emitting units 31 in the middle part of the light bar 3 may be set to 12 mm, and the distance between adjacent light-emitting units 31 in the end part of the light bar 3 may be set to 8 mm. Optionally, the plurality of light-emitting units 31 on the light bar can also be arranged at equal intervals along the first direction, which is not limited here and can be set according to the actual situation.

The above-mentioned light-emitting unit 31 can be an LED light source, and the number of LED light sources on the light bar 3 can be set to 60ea or 80ea, etc. For example, 60ea LED light sources on the light bar 3 are arranged in a manner with different densities, or 80ea LED light sources are arranged at equal intervals, etc. The specific number of the above-mentioned light-emitting units 31 can be determined according to the actual situation, and is not limited here.

Figure 11:
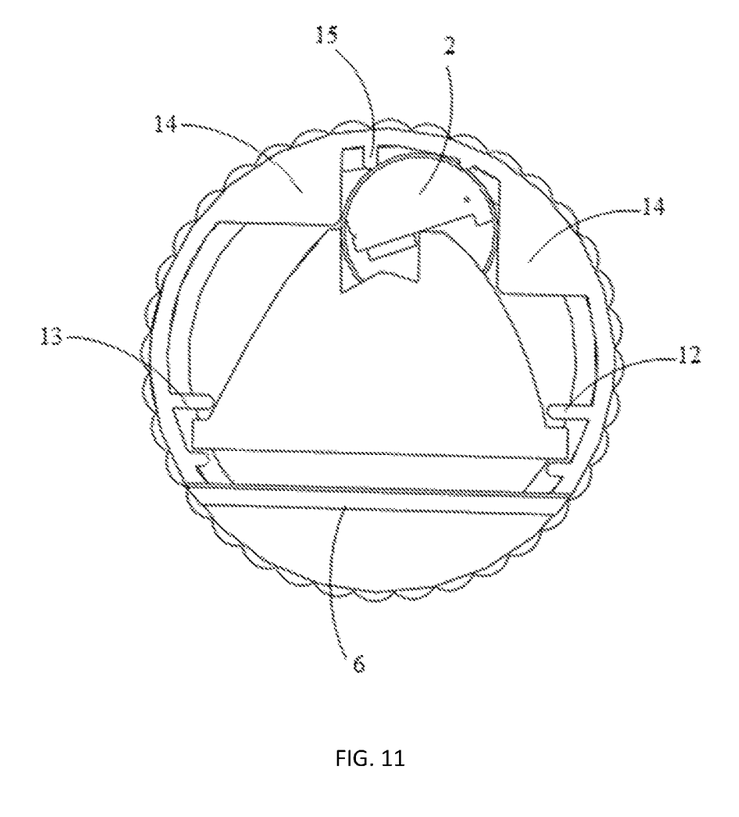
FIG. 11 is a cross-sectional view of a front light source according to an embodiment of the present disclosure.

In embodiments of the present disclosure, positions of the polarizing lens 4 and the supporting frame 2 need to be limited by a limiting structure inside the housing 1. As shown in FIG. 11, an intersection of the light exiting surface 42 and the first reflective curved surface 43 of the polarizing lens 4 may have a first limiting portion 46 extending along the first direction, and an intersection of the light exiting surface 42 and the second reflective curved surface 44 has a second limiting portion 47 extending along the first direction. And, the inner wall of the housing 1 can be provided with first limiting protrusions 12 located on both sides of the first limiting portion 46 and second limiting protrusions 13 located on both sides of the second limiting portion 47, fixing a side of the light exiting surface 42 of the polarizing lens 4.

As shown in FIG. 11, an area of the inner wall of the housing 1 adjacent to the light incident surface 41 has third limiting protrusions 14 located on both sides of the accommodating groove 45. The third limiting protrusions 14 are in contact with the polarizing lens 4. The third limiting protrusions 14 cooperate with the first limiting protrusions 12 and the second limiting protrusions 13 to limit a position of the polarizing lens 4 and prevent the polarizing lens 4 from moving.

As shown in FIG. 11, the above-mentioned supporting frame 2 is located between the third limiting protrusions 14 on both sides of the accommodation groove 45. The supporting surface of the supporting frame 2 is in contact with the notch of the accommodation groove 45. The support surface of the supporting frame 2 is in contact with the notch of the accommodation groove 45 through the light bar 3. The inner wall of the housing 1 has a fourth limiting protrusion 15 that is in contact with a surface of a side of the supporting frame 2 far away from the polarizing lens 4. The fourth limiting protrusion 15, the third limiting protrusions 14 and the polarizing lens 4 can cooperate to limit a position of the supporting frame 2. As shown in FIG. 11, the inner wall of the housing 1 may be provided with two fourth limiting protrusions 15, or one fourth limiting protrusion 15. The number of the fourth limiting protrusions 15 is not limited here, and can be set according to the actual situation.

As shown in FIG. 9, the above-mentioned first limiting protrusion 12, second limiting protrusion 13, third limiting protrusion 14 and fourth limiting protrusion 15 may all be strip structures extending along the first direction, to restrict the positions of the polarizing lens 4 and the supporting frame 2, or can also be a multi segment block structure arranged along the first direction, etc., which is not limited here.

In embodiments of the present disclosure, as shown in FIG. 11, the above-mentioned light bar 3 may include a first area with the light-emitting units 31 and a second area without the light-emitting units 31. The first area of the light bar 3 is located in the accommodating groove 45. The second area of the light bar 3 can be in contact with the notch of the accommodating groove 45, and the side of the supporting frame 2 far away from the polarizing lens 4 can be in a shape of a circular arc towards the fourth limiting protrusion 15. By matching the circular arc shaped surface of support frame 2 with the fourth limit protrusion 15, relative rotation between support frame 2 and the fourth limit protrusion 15 can be achieved, allowing support frame 2 to rotate around the axis extending along the first direction.

Figure 12:
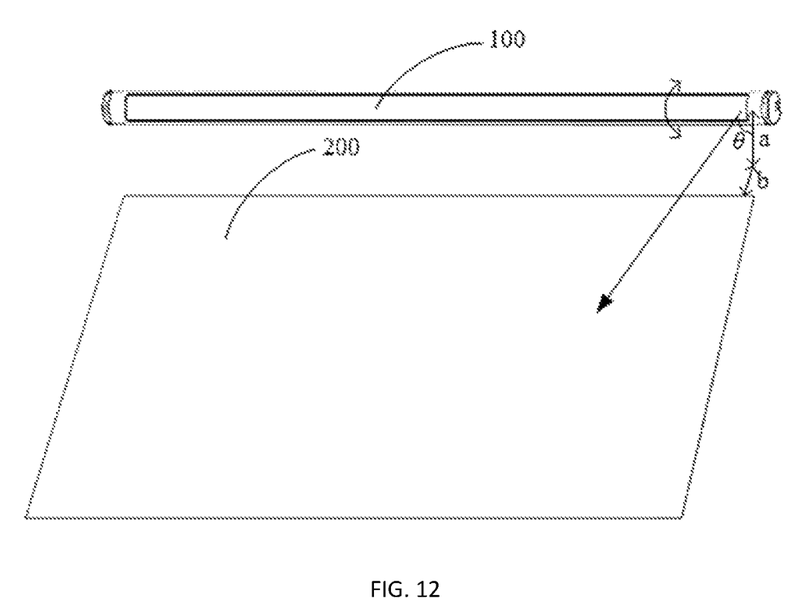
FIG. 12 is a schematic structural diagram of a display device according to an embodiment of the present disclosure.

Embodiments of the present disclosure also provide a display device, as shown in FIG. 12, including any one of the front light sources 100 according to above embodiments and a reflective display screen 200. The front light source 100 is arranged on a light emitting side of the reflective display screen 200, and does not block a light-emitting surface of the reflective display screen 200, the opening in the housing of the front light source 100 is facing the reflective display screen.

The above-mentioned front light source is arranged adjacent to a first side of the reflective display screen. A distance a between the front light source and a first surface where the light-emitting surface of the reflective display screen is located can range from 150 mm to 170 mm. A distance b between an orthographic projection of the front light source on the first surface and the first side can range from 0 mm to 30 mm. For example, the distance a can be set to 0 mm and the distance b can be set to 150 mm. In practical applications, values of a and b mentioned above can be determined according to the actual situation, and are not limited here.

An angle θ between an opening orientation of the front light source and a direction perpendicular to the reflective display screen may range from 45° to 50°. For example, the angle between the opening orientation and the direction perpendicular to the reflective display screen may be 45°.

In the above display device, the front light source used for providing ambient lighting for the reflective display screen in a dark environment has a polarizing lens, which can change the direction of light travel and achieve asymmetric lighting effects, and make more light irradiate towards the far end of the reflective display screen, improving the picture uniformity of the reflective display screen, alleviating the phenomenon of bright low-beam end and dark high-beam end under illumination of ordinary light sources, reducing the vertical height of the front light source above the reflective display screen, and making the structure more compact and beautiful.

In practical applications, taking the uniformity of the 23.8-inch reflective display screen as the optimization objective, by adjusting positions a, b, θ of the front light source, the relative position between the polarizing lens and the light-emitting unit, and the surface shapes of the first second reflective surface and second reflective surface of the polarizing lens, the brightness ratio between the high-beam end and the low-beam end of the front light source in embodiments can reach 57.08%, while the brightness ratio between the high-beam end and low-beam end of existing ordinary light sources is only 0%. This can optimize the uniformity of light irradiation on reflective display screens from the existing 10.9% to 78.5%, greatly alleviating the problem of bright low-beam end and dark high-beam end under light source illumination in dark environments of reflective display screens.

Evidently those skilled in the art can make various modifications and variations to the present disclosure without departing from the spirit and scope of the present disclosure. Thus the present disclosure is also intended to encompass these modifications and variations therein as long as these modifications and variations to the present disclosure come into the scope of the claims of the present disclosure and their equivalents.

What is claimed is:

1. A front light source, comprising:
   a housing extending along a first direction, and a side wall of the housing having an opening extending along the first direction;
   a supporting frame, located inside the housing and extending along the first direction, wherein the supporting frame comprises a supporting surface;
   a light bar, wherein the light bar extends along the first direction and is attached to the supporting surface of the supporting frame; and a side of the light bar far away from the supporting surface has a plurality of light-emitting units arranged along the first direction;
   a polarizing lens, wherein the polarizing lens is located between the light bar and the opening and extends along the first direction;
   wherein the polarizing lens comprises: a light incident surface, a light exiting surface, a first reflective curved surface and a second reflective curved surface, extending along the first direction;
   the light incident surface is arranged close to the light bar, the light exiting surface is opposite to the opening and parallel to the light incident surface;
   the first reflective curved surface and the second reflective curved surface are connected between the light incident surface and the light exiting surface, and distances between the first reflective curved surface and the second reflective curved surface gradually increases along a direction in which the light incident surface points to the light exiting surface; and
   both the first reflective curved surface and the second reflective curved surface protrude toward an inner wall of the housing, and a curvature of the first reflective curved surface is greater than a curvature of the second reflective curved surface.

2. The front light source according to claim 1, wherein the curvature of the first reflective curved surface ranges from 0 to 0.21; and the curvature of the second reflective curved surface ranges from 0 to 0.14.

3. The front light source according to claim 1, wherein the light incident surface of the polarizing lens is provided with an accommodating groove extending along the first direction, and the plurality of light-emitting units are located in the accommodating groove.

4. The front light source according to claim 3, wherein side walls of the accommodating groove are flat surfaces, and a bottom surface of the accommodating groove is a curved surface convex toward a notch of the accommodating groove;
   a depth of the accommodating groove on a side adjacent to the first reflective curved surface is smaller than a depth of the accommodating groove on a side adjacent to the second reflective curved surface.

5. The front light source according to claim 3, wherein a curvature of the bottom surface of the accommodating groove ranges from 0 to 0.45.

6. The front light source according to claim 1, wherein the light exiting surface is a flat surface, and a surface of the light exiting surface is smooth or frosted.

7. The front light source according to claim 1, wherein the supporting surface of the supporting frame is oriented toward the first reflective curved surface, and an angle between the supporting surface of the supporting frame and the light exiting surface ranges from 15° to 20°.

8. The front light source according to claim 1, wherein the supporting frame is rotatable around an axis extending along the first direction.

9. The front light source according to claim 1, wherein the housing is a tubular structure extending along the first direction, and both ends of the housing are provided with side covers for packaging.

10. The front light source according to claim 9, wherein the side cover is provided with a through hole corresponding to an end of the supporting frame, and the end of the supporting frame extends out of the housing from the corresponding through hole.

11. The front light source according to claim 1, wherein distances between two adjacent light-emitting units gradually decrease along a direction in which a middle area of the light bar points to an end of the light bar; or
the plurality of light-emitting units on the light bar are arranged at equal intervals along the first direction.

12. The front light source according to claim 3, wherein an intersection of the light exiting surface and the first reflective curved surface has a first limiting portion extending along the first direction, and an intersection of the light exiting surface and the second reflective curved surface has a second limiting portion extending along the first direction;
an inner wall of the housing has first limiting protrusions located on both sides of the first limiting portion, and second limiting protrusions located on both sides of the second limiting portion.

13. The front light source according to claim 12, wherein an area of the inner wall of the housing adjacent to the light incident surface has third limiting protrusions located on both sides of the accommodating groove;
the third limiting protrusions are in contact with the polarizing lens, the third limiting protrusions cooperate with the first limiting protrusions and the second limiting protrusions to limit a position of the polarizing lens.

14. The front light source according to claim 13, wherein the supporting frame is located between the third limiting protrusions on both sides of the accommodation groove, and the supporting surface of the supporting frame is in contact with the notch of the accommodation groove;
the inner wall of the housing has a fourth limiting protrusion that is in contact with a surface of a side of the supporting frame far away from the polarizing lens, and the fourth limiting protrusion, the third limiting protrusions and the polarizing lens cooperate with each other to limit a position of the supporting frame.

15. The front light source according to claim 14, wherein the light bar includes a first area with the light-emitting units and a second area without the light-emitting units, the first area of the light bar is located in the accommodating groove, and the second area of the light bar is in contact with the notch of the accommodating groove;
the side of the supporting frame far away from the polarizing lens is in a shape of a circular arc towards the fourth limiting protrusion.

16. A display device, comprising the front light source according to claim 1 and a reflective display screen;
wherein the front light source is arranged on a light-emitting side of the reflective display screen and does not block a light-emitting surface of the reflective display screen, the opening in the housing of the front light source is facing the reflective display screen.

17. The display device according to claim 16, wherein the front light source is arranged adjacent to a first side of the reflective display screen;
a distance between the front light source and a first surface where the light-emitting surface of the reflective display screen is located ranges from 150 mm to 170 mm; and
a distance between an orthographic projection of the front light source on the first surface and the first side ranges from 0 mm to 30 mm.

18. The display device according to claim 17, wherein an angle between an opening orientation of the front light source and a direction perpendicular to the reflective display screen ranges from 45° to 50°.

* * * * *